United States Patent [19]

Saxena

[11] 4,280,148
[45] Jul. 21, 1981

[54] AUDIO RECORDING APPARATUS AND METHOD

[76] Inventor: Arjun N. Saxena, 4217 Pomona Ave., Palo Alto, Calif. 94306

[21] Appl. No.: 113,886

[22] Filed: Jan. 21, 1980

[51] Int. Cl.$^3$ ............................................. G11B 27/02
[52] U.S. Cl. ..................................................... 360/13
[58] Field of Search ........................ 360/13, 22, 31, 63

[56] References Cited

U.S. PATENT DOCUMENTS

| | | | |
|---|---|---|---|
| 3,789,159 | 1/1974 | Feit et al. | 360/13 |
| 3,879,751 | 4/1975 | Gimelli | 360/13 |

Primary Examiner—Vincent P. Canney
Attorney, Agent, or Firm—John L. McGannon

[57] ABSTRACT

A system for recording audio signals generated from a plurality of locations in which the signals from such locations can be selectively recorded or not recorded depending upon the audio effect to be reproduced. One embodiment of the system includes three acoustically isolated rooms with the interiors of the rooms being visually observable, directly or via television, from any of the other rooms. In one room, one or more performers can be positioned, in a second room a plurality of performers can be located, and in the third room recording equipment can be placed. The recording equipment comprises a plurality of recording devices with each device having a recording medium, such as a disk or magnetic tape. The medium of each recording device can have one or more recording channels with each channel being provided with a recording head. Thus, a performer in the one room can be recorded on the medium of one recording device along with all of the performers in the second room, and the performer in the first room can be recorded alone on the recording medium of another device. Similarly, all of the performers in the second room can be recorded on a third device without the performer in the one room, and all of the performers can be recorded on the medium of still another recording device with the audio signals from one or more of the performers in one room being at a lessor or greater volume that the performers of the other room. All of the foregoing recording acts can be done simultaneously with conventional recording equipment.

10 Claims, 1 Drawing Figure

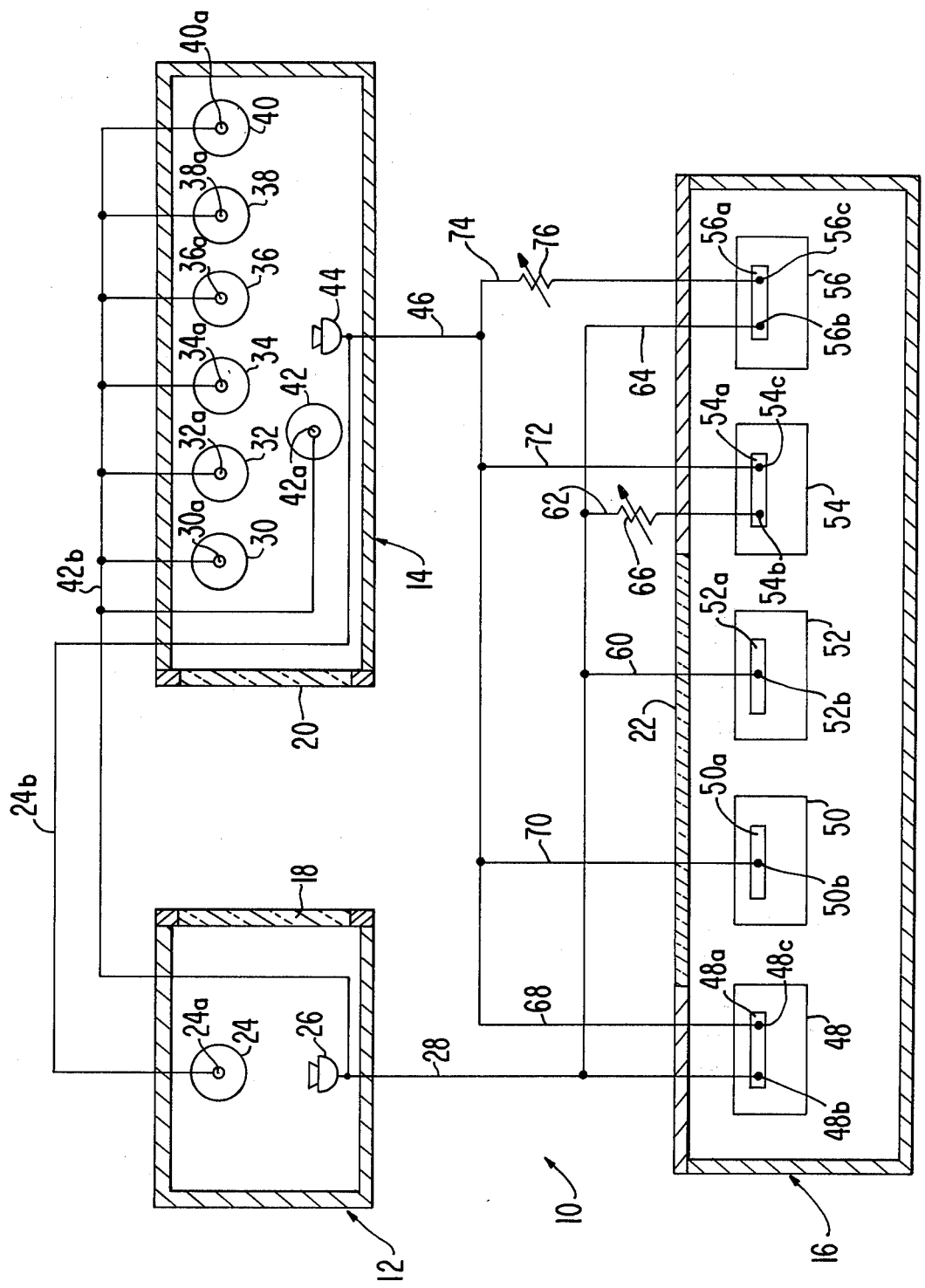

AUDIO RECORDING APPARATUS AND METHOD

This invention relates to improvements in audio recording techniques and more particularly, to recording of audio signals suitable for broadcast quality reproductions.

BACKGROUND OF THE INVENTION

In conventional commercial broadcasting facilities, a singer and an orchestra typically are recorded in stereo on a single recording medium, such as a rotatable disk or a magnetic tape. The singer is typically in the same room as the orchestra and the microphone or microphones which sense the audio signals from the orchestra also simultaneously sense the audio signals emanating from the singer although the singer has an individual microphone nearby. The resulting recording provides a reproduction of the combined audio output of the orchestra and the singer, but the singer's output cannot be isolated from the orchestra output and vice versa. Moreover, the singer's output cannot be adjusted in volume without affecting the volume of the output of the orchestra. Thus, the type and quality of the recording which is capable of being achieved with commercial systems is limited and cannot provide the versatility which would make recording media much more widely usable in entertainment and in educational applications. A need has, therefore, arisen for an improved audio recording technique which can achieve this aim without materially increasing capital investment and studio equipment costs.

Applicable prior art in audio recording includes the following U.S. Pat. Nos. 1,765,735; 2,519,103 and 3,843,137.

SUMMARY OF THE INVENTION

The present invention satisfies the aforesaid need by providing a novel recording apparatus and method in which audio signals generated at a plurality of different locations, such as in two acoustically isolated rooms, can be recorded together, can be recorded separately, or can be recorded in a manner such that the audio signals from one location have a higher or lower volume output than the signals from another location. The invention lends itself to commercial broadcast techniques in which it is desirable to record performers in musical groups, plays, debates or the like.

For instance, in a musical group, it is desirable to record a singer's audio output separate from that of an orchestra and together with the orchestra. In this way, the singer's audio output can be used in any desired manner with or without the accompaniment of the orchestra for entertainment purposes as well as for purposes of education. Other possibilities are available in carrying out the teachings of the present invention. For instance, in a symphonic orchestra, it may be desirable to acoustically isolate or "take out" one of the instruments from the rest of the orchestra, such as a piano or violin. By placing this "taken out" instrument in an isolated room separate from the room containing the other instruments of the orchestra, it is possible to record the audio signals generated by the "taken out" instrument with or without the orchestra accompaniment, and at a lower or greater volume than the audio output of the orchestra. In this way, selectivity in audio signals can be achieved by the special way in which the audio signals are generated and recorded.

The apparatus of the present invention includes a first room for at least one performer, i.e., a singer, a second room for a group of other performers, i.e., the members of an orchestra, and a third room for containing the audio recording equipment. All three rooms are acoustically isolated from each other but a person in one room has visual contact with activities and persons in the other two rooms. Such visual contact need not necessarily be due to direct viewing through clear windows, but it could be due to an appropriate television set up. The latter will also allow that the three rooms mentioned above need not be in close proximity to each other. In fact, they can be in different cities. Each of the first and second rooms has at least one microphone and each performer has a pair of earphones which acoustically places the performer in communication with the other performers.

The recording equipment includes commercial recording apparatus, such as disk recorders or tape recorders, and each recording device has a recording medium which may have one or more recording channels thereon with each channel having its own magnetic recording head associated with it. Thus, it is possible to record in stereo on the two channels or in monaural on one of the channels of the recording medium of one of the recording devices, and the media of other recording devices can receive other audio signals which are separate from those on the medium of the first device. All of the recording is done simultaneously and the recording medium of each recording device can be synchronized with the recording medium of one of the other recording devices, thereby providing a system having broadcast quality yet one in which equipment is of conventional construction and not requiring specialized skills on the part of operating personnel.

The primary object of this invention is to provide a system of recording audio signals from a plurality of acoustically isolated locations wherein the signals generated from one location can be recorded with or without the accompaniment of the audio signals generated at the other location and permutations in the volume of the audio signals from one location can be made relative to the volume of the audio signals from other locations, all of which provides a number of simultaneously recorded audio reproductions on recording media which can be used for entertainment purposes or for educational uses, whichever may be desired.

Other objects of this invention will become apparent as the following specification progresses, reference being made to the single FIGURE of drawing which schematically illustrate the arrangements of performers and recording equipment all linked together in a manner to carry out the teachings of the present invention.

The recording system of the present invention is broadly denoted by the numeral 10 and includes three rooms or enclosures 12, 14 and 16 which are acoustically isolated from each other but which permit visual contact by direct viewing or via television, to be made between individual persons in the rooms. To achieve visual contact by direct viewing, room 12 has a window 18, room 14 has a window 20 and room 16 has a window 22. Thus, a person in room 12 can view activities and persons in rooms 14 and 16. To achieve visual contact via television, the windows referred to above are not necessary, and appropriate positioning of television cameras and monitors is done in the respective rooms. This method of visual contact via television will also allow that one or more of the above-mentioned acoustically isolated rooms can be far removed from each other. While the rooms have been shown as being rectangular and arranged in a specific manner, the rooms can have other shapes and can be arranged in a different fashion, if desired. The only criteria are that the rooms are acoustically isolated from each other but permit visual contact therebetween.

Room 12 is provided to contain a first performer, such as a singer, denoted by the numeral 24. A microphone 26 is also in room 12 to sense the audio signals emitted or generated by performer 24 and the electronic signals from the microphone are directed outwardly of room 12 along a line 28 and recorded in room 16 in a manner to be described.

In room 14, a number of other performers, such as orchestra members are located at spaced positions and the performers are denoted by the numerals 30, 32, 34, 36, 38 and 40. There may be more or fewer performers than the six shown in room 14; however, the six performers are shown only for illustration purposes. The performers, if they are members of an orchestra, are lead by a leader or conductor denoted by the numeral 42.

One or more microphones 44 are provided in room 14. While only a single microphone 44 is shown, and this microphone being near conductor 42, it is understood that two or more microphones may be used as for stereophonic recording. Further, if it is so desired, each of performers 30–40 could have an individual microphone nearby. Each microphone 44 senses audio signals generated by the performers and conductor in room 14 and the output signals of each microphone 44 is directed out of room 14 along a line 46 to recording means in room 16 as hereinafter described.

To permit performer 24 in room 12 to hear the audio signals sensed by microphone 44, performer 24 is provided with an earphone 24a coupled by a line 24b to the output of microphone 44, or additional microphones, as the case may be. Similarly, performers 30–40 have earphones 30a–40a and conductor 42 has earphones 42a all connected by a lead 42b to the output of microphone 26 in room 12. Thus, the performers and conductor in room 14 can hear the audio signals sensed by microphone 26 in room 12 and performers 24 can hear the audio output of each microphone 44.

Room 16 houses the apparatus for recording the audio signals sensed by microphones 26 and 44. For purposes of illustration, there are five recording devices 48, 50, 52, 54 and 56 in room 16. Each of the recording devices has a recording medium, such as a disk or magnetic tape, the media for devices 48–56 being denoted by the numerals 48a–56a. Moreover, each of the recording media 48a–56a may have one or more recording channels or tracks thereon for stereo recording and each track or channel will have its own recording head. For instance, medium 48a has two tracks or channels and therefore has two heads 48b and 48c. Similarly, media 54a and 56a are of the two-channel type and each has a recording head for each channel, respectively. Media 50a and 52a are of the single channel type and have a single recording head. All of the foregoing description with reference to the equipment in room 16 is for purposes of illustration. It is possible to have more or fewer recording devices and each device may have a recording medium with one or more recording heads associated with it.

Also for purposes of illustration, line 28 is coupled to head 48b of device 48 and is connected to a line 58 and individual lines 60, 62 and 64. Line 60 extends to and is coupled with the recording head 52b of device 52. Line 62 has a variable gain device 66 and the line is coupled to head 54b of device 54. Line 64 is coupled to head 56b of device 56.

Line 46 is coupled with lines 68, 70, 72 and 74. Line 68 is connected to head 48c of device 48; line 70 is connected to head 50b of device 50; line 72 is coupled to head 54c of device 54; and line 74 is connected to head 56c of device 56. A variable gain device 76 is coupled with line 74.

In use, medium 48a of device 48 records in stereo the entire audio signal output of microphones 26 and 44 from rooms 12 and 14. For monaural, a single head combining the signals from microphones 26 and 44 is used. For instance, if performer 24 is a singer and performers 30–40 are members of an orchestra, medium 48a records the entire musical number played by the orchestra and sung by the singer. Simultaneously, medium 52a records only the singer's voice while medium 50a records only the orchestra members audio output and not that of the singer. Medium 54a records in stereo the orchestra and singer but records the singer's voice which is at a higher or lower volume depending upon the setting of variable gain device 66. Medium 56a records in stereo the orchestra and normal voice of the singer but records the orchestra at a higher or lower volume depending upon the setting of variable gain device 76.

As another example, performers 30–40 described above could be an all-instrument orchestra playing a symphony or any other musical number. For instance, one instrument could be chosen to be "taken out" from the rest of the instruments of the orchestra and placed in room 12. For example, the lead piano or violin could be "taken out" as the singer 24 in the first illustration was "taken out". In such a case, the instrument "taken out" could be recorded with and without the remainder of the orchestra in the manner described above with reference to the singer and orchestra in the first example.

As a third example, two or more parts of a musical number are recorded separately and the balance of the musical number without these two or more parts is recorded separately, resulting in two separate recording media. Examples similar to the first and second examples above can be given for producing a variety of recording media. The number of recording media in each category is greater than five because the permutations of various components missing or present add to the number five as described above. The objective defined above and the invention described are applicable not only to musical numbers but also to dialogues, such as plays, debates and the like.

A variety of other cases can be given similar to the examples mentioned above for two or more components to be "taken out" from the rest of the musical number. The player for these two or more components can be placed in room 12 and the balance of the performers can be placed in room 14. The rest of the arrangement and the types of recordings remain the same as those described above with respect to the first example.

Minor variations from the invention described above can be done without departing from the scope of the invention. For instance, not all of the recordings from devices 48–56 need to be made. Depending upon the application, only one or more recordings on devices 48–56 may be made. The above invention is applicable to all the methods of recording. As an example, conventional analog recording and digital recording can be made with the invention. The different combination of various recordings can be chosen for a particular type of market, such as the entertainment market or educational market.

For the entertainment market, the recorded media of the present invention can be used in a number of ways. For instance, a budding singer may purchase the recording medium 48a with both singer and orchestra recorded thereon so as to permit the budding singer to listen and be instructed as to how the budding singer should sound in actual practice. Then the budding singer could purchase medium 50a, that has the orchestra alone, so as to be able to sing also as a solo performance with the orchestra. In the alternative, the budding singer could purchase medium 54a so as to be able to sing with the orchestra yet have the singer 24 as background assistance. This same technique could be followed in the case of a budding instrument player in an orchestra. In the educational market, each medium could have the same types of recordings and can be used in the same manner as described above in the entertainment market applications in teaching vocal and/or instrumental music such as popular, classical and operatic music.

I claim:

1. Apparatus for recording audio signals from a plurality of locations comprising: a first room for housing at least one performer, the first room having a first microphone therein for receiving audio signals from the performer therein; a second room adapted to house at least one other performer, the second room having a second microphone therein for receiving audio signals from the second performer; a third room having a plurality of recording devices therein, each of the rooms being acoustically isolated from the other rooms; means for each room, respectively, for placing it in visual contact with the other rooms, each recording device having a recording medium associated therewith, each recording medium having at least one recording channel thereon, there being a recording head for each channel, respectively, of each recording medium; and means for electrically coupling the first and second microphones with the recording heads of selected ones of the recording devices so that audio signals of the performers in both rooms can be recorded together on a first medium, can be recorded separately on second and third media, and can be recorded at greater or lesser volume on channels of fourth and fifth media.

2. Apparatus as set forth in claim 1, wherein the second room is adapted to contain a plurality of second performers, there being more than a single microphone in the second room.

3. Apparatus as set forth in claim 1, wherein is provided a pair of earphones for each of the first and second rooms respectively, the earphones of the first room being acoustically coupled to the second microphone, and the earphones in the second room being acoustically coupled to the first microphone.

4. Apparatus as set forth in claim 3, wherein the second room is adapted to house a plurality of performers with each performer having a pair of earphones, respectively, the earphones of the performers in the second room being coupled by a common line to the first microphone.

5. Apparatus as set forth in claim 1, wherein said electrical coupling means includes a first line coupling the first microphone to a first recording device and a second line coupling the second microphone to the first recording device, one of the lines having a variable gain device therein to control the volume of the signals being carried by such line.

6. Apparatus as set forth in claim 1, wherein the rooms are adjacent to each other, said placing means includes a window for each room, respectively.

7. Apparatus as set forth in clam 1, wherein at least one of the rooms is remote from the other room, said placing means including a television system for each room, respectively.

8. A method of audio recording comprising: generating a first set of audio signals in a first region; generating a second set of audio signals in a second region acoustically isolated from the first region; recording the audio signals from both regions on a first recording medium in a third region acoustically isolated from the first and second regions; recording the acoustical signals from the first region on a second recording medium in the third region; recording only the audio signals from the second region on a third recording medium in the third region; and recording the audio signals from the first and second regions on a fourth recording medium in the third region with the audio signals from one of the regions having a volume selectively controllable over the volume of the audio signals from the other region.

9. A method as set forth in claim 8, wherein is concluded the step of permitting a performer in the first region to hear the audio signals of a performer in the second region without permitting the audio signals of the second region to be mixed with the audio signals generated in the first region.

10. A method as set forth in claim 8, wherein is included the step of permitting the performers in the second region to hear the audio signals generated in the first region without allowing the audio signals of the first region to mix with the audio signals generated in the second region.

* * * * *